United States Patent
Deluca et al.

(10) Patent No.: US 10,901,688 B2
(45) Date of Patent: Jan. 26, 2021

(54) NATURAL LANGUAGE COMMAND INTERFACE FOR APPLICATION MANAGEMENT

(71) Applicant: INTERNATIONAL BUSINESS MACHINES CORPORATION, Armonk, NY (US)

(72) Inventors: Lisa Seacat Deluca, Baltimore, MD (US); Kelley Anders, East New Market, MD (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 5 days.

(21) Appl. No.: 16/129,215

(22) Filed: Sep. 12, 2018

(65) Prior Publication Data

US 2020/0081753 A1   Mar. 12, 2020

(51) Int. Cl.
| | |
|---|---|
| *G06F 16/00* | (2019.01) |
| *G06F 3/16* | (2006.01) |
| *G06F 11/30* | (2006.01) |
| *G06F 9/451* | (2018.01) |
| *G06F 9/54* | (2006.01) |

(52) U.S. Cl.
CPC ............. *G06F 3/167* (2013.01); *G06F 9/451* (2018.02); *G06F 11/3051* (2013.01); *G06F 9/544* (2013.01)

(58) Field of Classification Search
CPC ...... G06F 9/544; G06F 9/451; G06F 9/45512; G06F 11/3051
See application file for complete search history.

(56) References Cited

U.S. PATENT DOCUMENTS

| | | | |
|---|---|---|---|
| 6,125,347 A | 9/2000 | Cote et al. | |
| 7,389,236 B2 | 6/2008 | James | |
| 8,996,375 B1* | 3/2015 | Gagnon | .................. G10L 15/19 |
| | | | 704/257 |
| 2003/0046401 A1 | 3/2003 | Abbott et al. | |
| 2004/0102971 A1 | 5/2004 | Lipscher et al. | |
| 2005/0043949 A1 | 2/2005 | Roth et al. | |
| 2006/0041431 A1* | 2/2006 | Maes | .................... H04L 65/607 |
| | | | 704/270.1 |
| 2009/0192800 A1 | 7/2009 | Brandt | |
| 2010/0131482 A1 | 5/2010 | Linthicum et al. | |

(Continued)

FOREIGN PATENT DOCUMENTS

| | | |
|---|---|---|
| JP | H07140998 A | 6/1995 |
| WO | 2014134093 A1 | 9/2014 |

*Primary Examiner* — Doon Y Chow
*Assistant Examiner* — Abdou K Seye
(74) *Attorney, Agent, or Firm* — Brian Restauro; Andrew D. Wright; Roberts Calderon Safran & Cole, P.C.

(57) ABSTRACT

In embodiments, a method includes detecting, by a computing device, open applications of the computing device; storing, by the computing device, a buffer that tags and tracks audio content and audio context of the open applications; receiving, by the computing device, a user request to take an action regarding at least one of the open applications; determining, by the computing device, a match between the user request and the at least one of the open applications utilizing the buffer; and initiating, by the computing device, a function based on the user request in response to determining the match.

17 Claims, 4 Drawing Sheets

(56) References Cited

U.S. PATENT DOCUMENTS

| | | |
|---|---|---|
| 2011/0113337 A1 | 5/2011 | Liu et al. |
| 2012/0059780 A1* | 3/2012 | Kononen .......... H04M 1/72569 |
| | | 706/14 |
| 2013/0013319 A1 | 1/2013 | Grant et al. |
| 2013/0132091 A1* | 5/2013 | Skerpac ................ G06F 21/32 |
| | | 704/273 |
| 2016/0092768 A1 | 3/2016 | Patil |
| 2016/0217786 A1* | 7/2016 | Jablokov ............... H04L 51/066 |
| 2017/0103754 A1* | 4/2017 | Higbie ................... G06F 3/167 |
| 2018/0077096 A1* | 3/2018 | DeMattei ................ H04L 51/10 |
| 2019/0228766 A1* | 7/2019 | White .................... G06F 40/40 |

* cited by examiner

NATURAL LANGUAGE COMMAND INTERFACE FOR APPLICATION MANAGEMENT

BACKGROUND

The present invention relates generally to graphical user interface management and, more particularly, to a natural language command interface for application management.

Modern computing devices enable multiple applications to be displayed simultaneously in a graphical user interface (GUI). A tabbed document interface (TDI) or a multiple document interface (MDI) allow multiple child windows to be displayed within a single parent window. Typically, a single child window at a time is "in focus", and is positioned in front (e.g., in the foreground) of all "out of focus" child windows (wherein the out of focus child windows are in the background). GUIs may utilize "tabs" to display open applications (e.g., child windows), allowing a user to easily switch between different content for viewing and/or interacting with the content. A user typically selects which child window is in focus by selecting the child window or tab, such as by clicking on a component of the child window or tab utilizing a mouse or other selection tool. Each child window may include content from respective applications, and the content may be active in the foreground or background, such as when audio data is playing in multiple child windows. Audio management modules of a computing device may enable multiple audio signals from respective child windows to be simultaneously played over speakers of the computing device at the same time.

SUMMARY

In an aspect of the invention, a computer-implemented method includes: detecting, by a computing device, open applications of the computing device; storing, by the computing device, a buffer that tags and tracks audio content and audio context of the open applications; receiving, by the computing device, a user request to take an action regarding at least one of the open applications; determining, by the computing device, a match between the user request and the at least one of the open applications utilizing the buffer; and initiating, by the computing device, a function based on the user request in response to the determining the match.

In another aspect of the invention, there is a computer program product including a computer readable storage medium having program instructions embodied therewith. The program instructions are executable by a computing device to cause the computing device to: detect open applications on a graphical user interface of the computing device; store a buffer that tags and tracks audio content and audio context of the open applications; receive a user request to take an action regarding at least one of the open applications; determine a match between the user request and the at least one of the open applications utilizing the buffer; and in response to the determining the match, initiate a function with respect to the at least one of the open applications based on the user request.

In another aspect of the invention, there is a system including a processor, a computer readable memory and a computer readable storage medium associated with a computing device. The system also includes: program instructions to detect open applications on the computing device; program instructions to store a buffer that tags and tracks audio content and audio context of the open applications in real time utilizing natural language processing; program instructions to receive a user voice command to take an action regarding at least one of the open applications; program instructions to determine a match between the user voice command and the at least one of the open applications utilizing the buffer; and program instructions to initiate a function with respect to the at least one of the open applications based on the user voice command after the determining the match, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
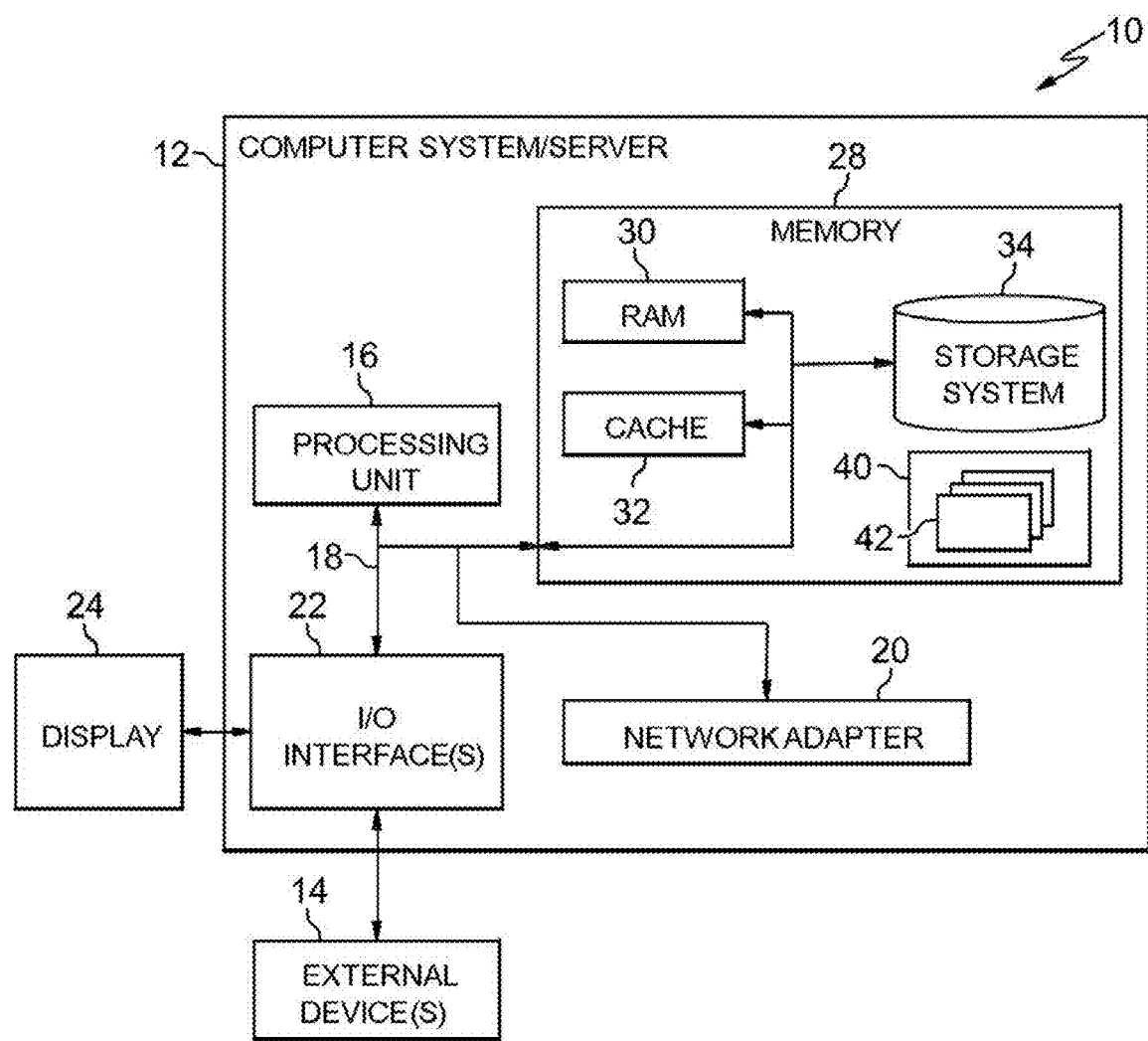
FIG. 1 depicts a computing infrastructure according to an embodiment of the present invention.

The present invention relates generally to graphical user interface management and, more particularly, to a natural language command interface for application management. In embodiments, a system and method are provided for monitoring an operating system of a computing device to determine open applications (e.g., web browser tabs), and storing a buffer that tags and tracks content and context of active audio data of the open applications. In aspects, a user alerts the computing device that the user would like to take an action with respect to an active media application (i.e., the source of the active audio data) using a voice command, such as "please stop the tab that is currently playing the commercial". In embodiments, the computing device analyzes the voice command for content and/or context and compares the content and/or context with content from the buffer to determine a match between the user's voice command and one or more active media applications. If no match is found, the computing device may prompt the user for additional information. If a match is found, the computing device takes an action with respect to the one or more active media applications based on the user's voice command (e.g., mutes the audio data, closes a tab associated with an active media application, etc.). In aspects, the computing device alerts the user which of the one or more active media applications matches the user's voice command (e.g., highlights a tab associated with the active media application).

Audio management modules of computing devices may enable audio files from multiple child windows (open applications) on a graphical user interface (GUI) to play simultaneously through one or more speakers associated with the computing device. Often, audio files are initiated by an application (e.g., popup window) automatically without permission from a user of the computing device. The playing of undesirable audio files may be irritating and embarrassing to a user. Moreover, it may be difficult for a user to identify the source of an active audio file when multiple child windows are open within a parent window at the same time, such as when a user has multiple web browser tabs open on a GUI. Advantageously, embodiments of the invention address the technical problem of multiple active audio files playing simultaneously on a computing device by enabling: matching of content/context of a user voice command with content/context of active audio files utilizing speech to text natural language processing, and automatic initiating an action/function (e.g., muting the child window associated with the unwanted audio file, closing the child window, etc.) based on the user's voice command. Accordingly, embodiments of the invention provide a technical solution to the technical problem of unwanted active audio files. Thus, embodiments of the invention constitute technical improvement in the field of GUI management by enabling automatic management of active audio files utilizing content/context recognition tools and methods.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
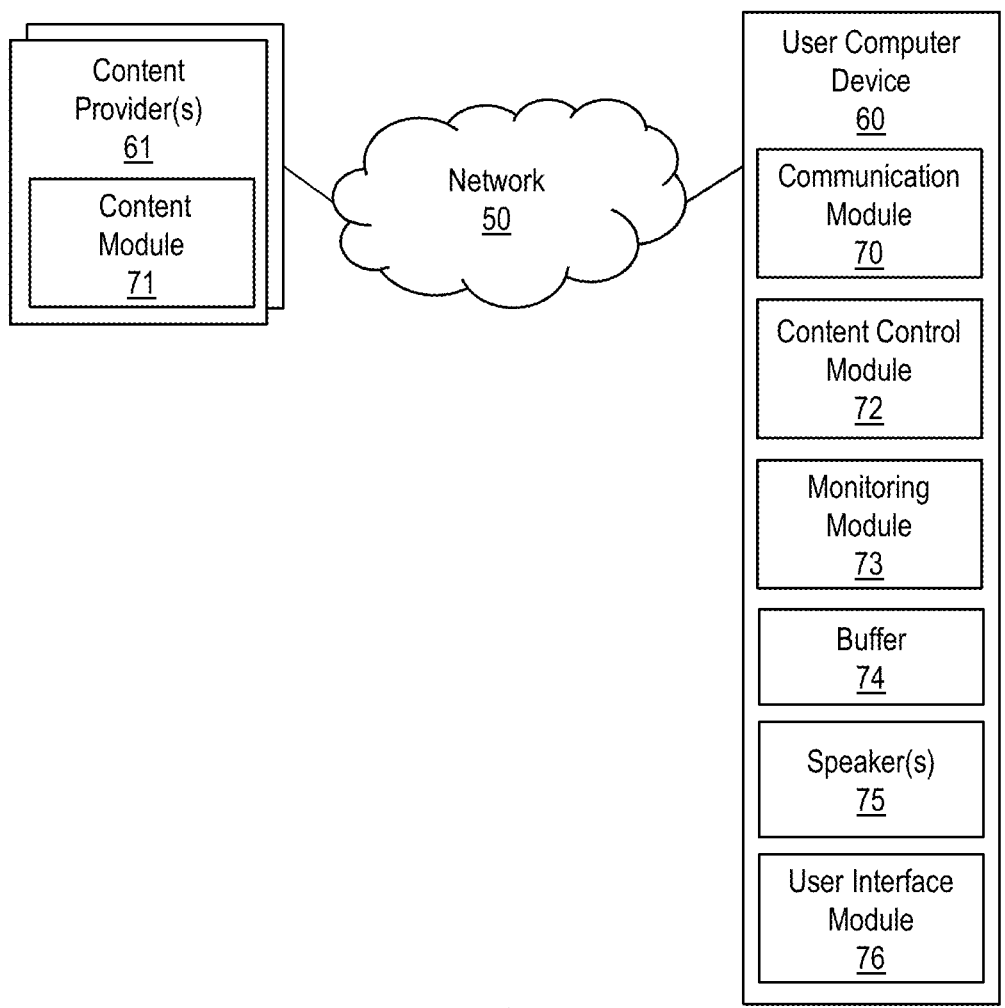
FIG. 2 shows an exemplary environment in accordance with aspects of the invention.

FIG. 2 shows an exemplary environment in accordance with aspects of the invention. The environment includes a network 50 connecting a user computer device 60 with one or more content providers 61. The user computer device 60 may comprise a computer system 12 of FIG. 1, and may be connected to the network 50 via the network adapter 20 of FIG. 1. The user computer device 60 may be in various forms, such as a desktop computer, laptop computer, tablet computer, smartphone, etc.

The network 50 may be any suitable communication network or combination of networks, such as a local area network (LAN), a general wide area network (WAN), and/or a public network (e.g., the Internet). The one or more content providers 61 (hereafter content provider 61) may be in the form of various computer devices such special purpose servers providing browsing content to the user computer device 60 via the network 50. In aspects, the content provider 61 comprises a server incorporating one or more elements of the computer system 12 of FIG. 1.

Still referring to FIG. 2, the user computer device 60 may include one or more program modules (e.g., program module 42 of FIG. 1) executed by the user computer device 60 and configured to perform one or more functions described herein. In embodiments, the user computer device 60 includes a communication module 70 configured to receive content from a content module 71 of a content provider 61 for presentation to the user. In aspects, the content module 71 of the content provider 61 is configured to provide browser content to the communication module 70 of the user computer device 60. In embodiments, the user computer device 60 includes a content control module 72 configured to manage the display of content to a user (e.g., using the display 24 of FIG. 1). In aspects, the content control module 72 is configured to manage audio and/or video files of applications executed by the user computer device 60.

In embodiments, a monitoring module 73 is configured to passively monitor the operating system (OS) of the user computer device 60 to determine applications in use (hereafter open applications), such as web browsers, games, utilities, communication software, etc. In aspects the monitoring module 73 determines child windows (e.g., web browser tabs) open within a main window of a graphical user interface (GUI) of the user computer device 60). In embodiments, the monitoring module 73 stores a buffer 74 that tags and tracks content and/or context of open applications playing audio content (e.g., active audio files) through one or more speakers 75 (hereafter speaker 75) of the user computer devise 60. The speaker 75 may be an external audio output device connected to the user computer device 60 directly or wirelessly, or may be integral to the user computer device 60.

In embodiments, the user computer device 60 includes a user interface module 76 configured to receive a user request to take action on an open application (e.g., child window). In aspects, the user interface module 76 is configured to perform speech to text natural language processing of a user request to determine content and/or context of the request, and matches the user request with content/context of an open application using the buffer 74. In embodiments, the user interface module 76 is configured to request additional information from a user if no match is found, and is also configured to determine the focus of an active application when the active application matches the user request. In aspects, the user interface module 76 is configured to send commands to the content control module 72 to take an action with respect to the active application based on the request (e.g., mute the audio file of the active application, close a browser tab, etc.). In embodiments, the content control module 72 automatically initiates an action requested by the user. In aspects, the content control module 72 identifies the active application to the user, thereby enabling the user to take direct action, such as through closing a browser tab using a graphical user interface (GUI) of the user computer device 60.

In embodiments, the user computer device 60 may include additional or fewer components than those shown in FIG. 2. In embodiments, separate components may be integrated into a single computing component or module. Additionally, or alternatively, a single component may be implemented as multiple computing components or modules. For example, the content control module 72 may comprise several modules controlling different aspects of content (e.g., video files, sound files, etc.). In another example, the user interface module 76 may be implemented as part of the content control module 72.

Figure 3:
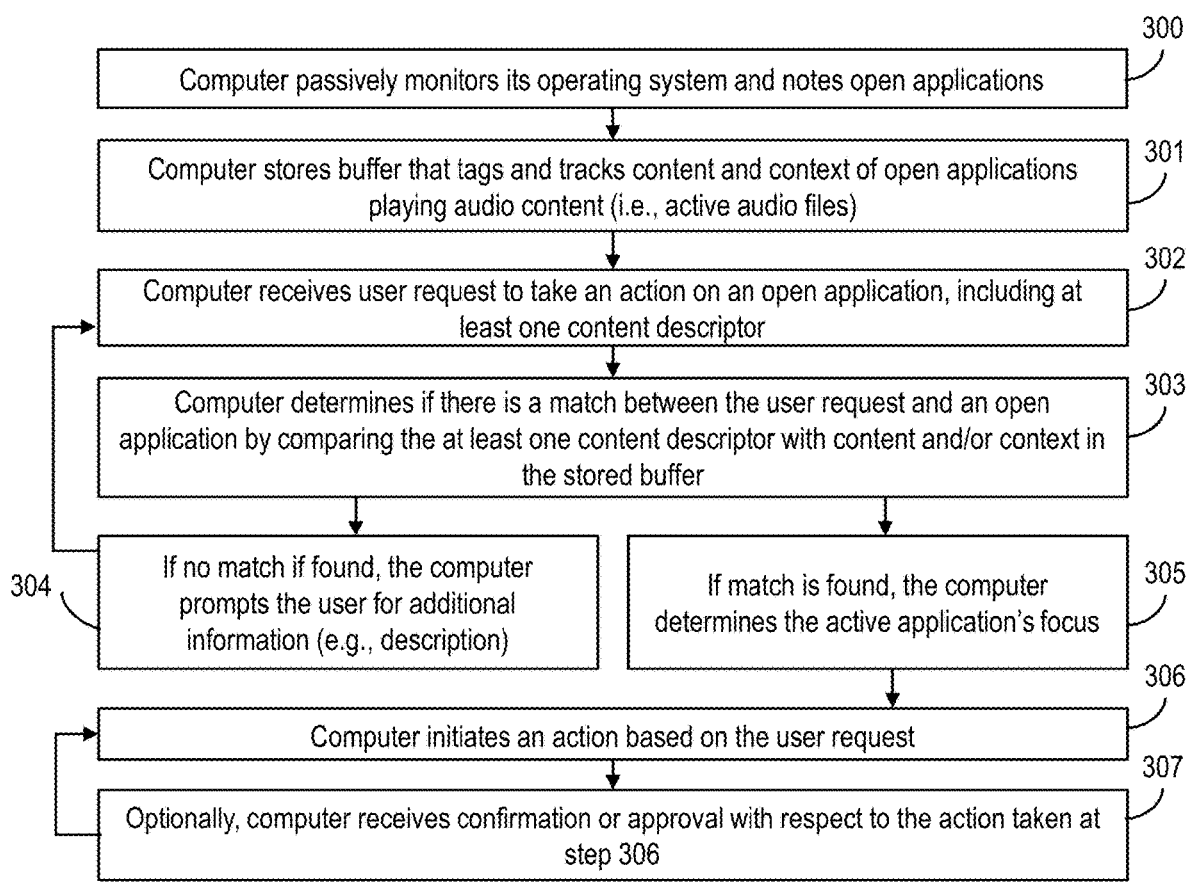
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the user computer device 60 monitors its operating system (OS) to determine (detect) open applications. The term application as used herein refers to a software program that runs on the user computer device 60, and may include web browsers, games, utilities, audio visual players and other software applications. In embodiments, the monitoring module 73 of the user computer device 60 passively monitors the OS of the user computer device 60 to determine one or more child windows open within a parent window of a GUI. The term open application as used herein refers to an application that is currently active on the computing device 60 (e.g., open browser tabs, open audio/video files, etc.). In one example, the monitoring module 73 determines open web browser tabs on the user computer device 60. In embodiments, the user computer device 60 determines when open applications are playing audio content (audio files).

At step 301, the user computer device 60 stores the buffer 74 that tags and tracks content and/or context of open applications playing audio content (active audio files). In aspects, the monitoring module 73 of the user computer device 60 performs step 301. In embodiments, the user computer device 60 utilizes natural language processing (NLP) tools and methods to determine content and/or context of audio content in real time as the audio content is playing. For example, the user computer device 60 may process audio data from an audio-video advertisement for dryer sheets playing within a child window on the user computer device 60, wherein the processing comprises NLP analysis techniques for recognizing content (e.g., subject matter of the commercial, such as dryer sheets) and context of the content (e.g., an advertisement).

At step 302, the user computer device 60 receives a user request to take an action regarding an open application monitored at step 300. In aspects, the user interface module 76 of the user computer device receives the user request in accordance with step 302 of FIG. 3. In embodiments, the user interface module 76 is part of a virtual assistant tool or plugin. In aspects, the virtual assistant tool or plugin is a built-in voice-controlled personal assistant configured to answer questions of a user and initiate computer functions (e.g., playing music) based on user commands. Such virtual assistant tools may utilize artificial intelligence and natural language processing method to interact with users. Additionally, such virtual assistants may be part of a smart-home or smart-building system for controlling appliances, lights, door locks or other smart devices.

In aspects, the user request includes a description of content or contexts (hereafter content descriptors). User requests may be in the form of voice commands or text-based commands. For example, a user may issue a voice command requesting that the user computer device 60 "please stop the tab that is currently playing the dryer sheet commercial," wherein the request includes the content descriptors "dryer sheet" and "commercial". Other examples of user requests include: "please stop the media that just said 'ask for a free trail today'"; "please stop the media that just had a sound of a baseball being hit"; "please stop the media that played police sirens"; "please stop the country music"; "pause the commercial"; "please stop the jazz music"; "stop the angry music"; "reduce the volume of the song by the female singer"; and "please stop the music by Performer X". Thus, it can be understood that different types of content descriptors can be utilized in a user request, including, for example: vocalization of words from an active audio file heard by the user; descriptions of sounds heard; gender of speaker; tone of the content; subject matter of an audio file; and types, themes and categories of content (e.g., genres of music).

At step 303, the user computer device 60 determines if there is a match between the user request and an open application (e.g., determines if there is a matching open application). In embodiments, NLP techniques are utilized to process an audio user request or a text-based user request to determine content of the request, including content descriptors. In aspects, the user computer device compares content descriptors in the user request with content and/or context of audio content in the buffer 74, to determine if there is a match between the user request and active audio files of an open application. In embodiments, the user interface module 76 implements steps 303. In one example, the user interface module 76 utilizes speech to text NLP techniques to determine that a voice command of a user (user request) includes the content "dryer sheet" and "commercial", which is recognized by the user interface module 76 as matching the content and/or context of an active audio file playing a dryer sheet commercial. It should be understood that while a match between a request and a single open application is discussed herein, the user computer device 60 may determine multiple matching open applications in accordance with embodiments of the invention. For example, a user may request that the user computer device 60 "turn off all advertisements", wherein multiple matching open applications of the user computer device 60 are playing audio files comprising advertisements.

At step 304, if no match is found by the user computer device 60 at step 303, the user computer device 60 prompts the user for additional information (e.g., content descriptors). In embodiments, the prompt includes an indication that the user computer device 60 does not understand the user request or does not have enough information to process the request. In aspects, the user interface module 76 of the user computer device 60 performs step 304. For example, the user interface module 76 may initiate a popup text window for viewing by the user or an audio statement announcing "I don't understand. Please provide additional information regarding the action you wish me to take." Steps 302-304 may be repeated until a match is found at step 305, as described below. For example, in response to a prompt indicating that no match was found, a user may issue a second user request with additional details regarding the audio content of interest, and the user computer device 60 may determine if a match can be found between the second user request and the content and/or context in the stored buffer 74.

At step 305, if the user computer device 60 finds a match at step 303 (e.g., finds a matching open application), the user computer device 60 determines a focus of the matching open application, including a location of the matching open application (e.g., child window) within a GUI of the user computer device 60. For example, a plurality of web browsing tabs may be open on a GUI of the user computer device 60, and the user computer device 60 may determine that the matching open application is the fourth tab in a stack of layered out of focus web browsing tabs. The term "in focus" as used herein refers to an open application (e.g., web browser tab) that is currently selected by a computing device (e.g., user computer device 60) to receive input. Conversely, the term "out of focus" as used herein refers to an open application that is not currently selected by the user computer device 60 to receive input. In aspects, the user interface module 76 of the user computer device 60 determines whether a matching open application is in focus (selected to receive input) or out of focus (not selected to receive input).

At step 306, the user computer device 60 initiates an action based on the user request received at step 302. In aspects, the user interface module 76 issues instructions to the content control module 72 based on the user request, and the content control module 72 initiates an action based on the user request. In embodiments, the user computer device 60 initiates the action in accordance with step 306 without changing the focus of the matching open application (e.g., without bringing an out of focus open application into focus). In other embodiments, the user computer device 60 brings an out of focus matching open application into focus as part of the initiation of the action in accordance with step 306. In aspects, the user computer device 60 automatically initiates an action based on the user request. In other aspects, the user computer device 60 automatically brings the matching open application to the attention of the user, such as through highlighting the open application or changing the focus of the matching open application.

Examples of actions that may be initiated by the user computer device 60 include, for example: muting an active audio file(s) of the matching open application; stopping a matching open application; muting audio of the matching open application; stopping the audio of the matching open application; changing a volume of the audio of the matching open application; bringing the matching open application in focus; closing the matching open application (e.g., close the web browsing tab); and highlighting or flagging the matching open application to the user.

In embodiments, the user computer device 60 initiates a notification to a user that an open application brought into focus by a user (i.e., an out of focus open application is clicked on by a user, thereby bringing it into focus), is the matching open application. In one example, the user computer device 60 mutes an audio file for a dryer sheet commercial based on a user request received in accordance with step 302 of FIG. 3, then notifies the user that the open application they clicked on (i.e., brought into focus) includes the muted content. Optionally, the action initiated at step 306 may include a follow up message (text or audio message) to the user requesting confirmation of the match of step 303, or may impart additional information to the user regarding the action taken by the user computer device 60 at step 306.

At step 307, the user computer device 60 optionally receives confirmation or approval from the user with respect to the action taken at step 306. For example, the user computer device 60 may request confirmation that a flagged or otherwise highlighted matching open application is the application playing the unwanted audio file, and the user computer device 60 may receive confirmation from the user at step 307.

Figure 4:
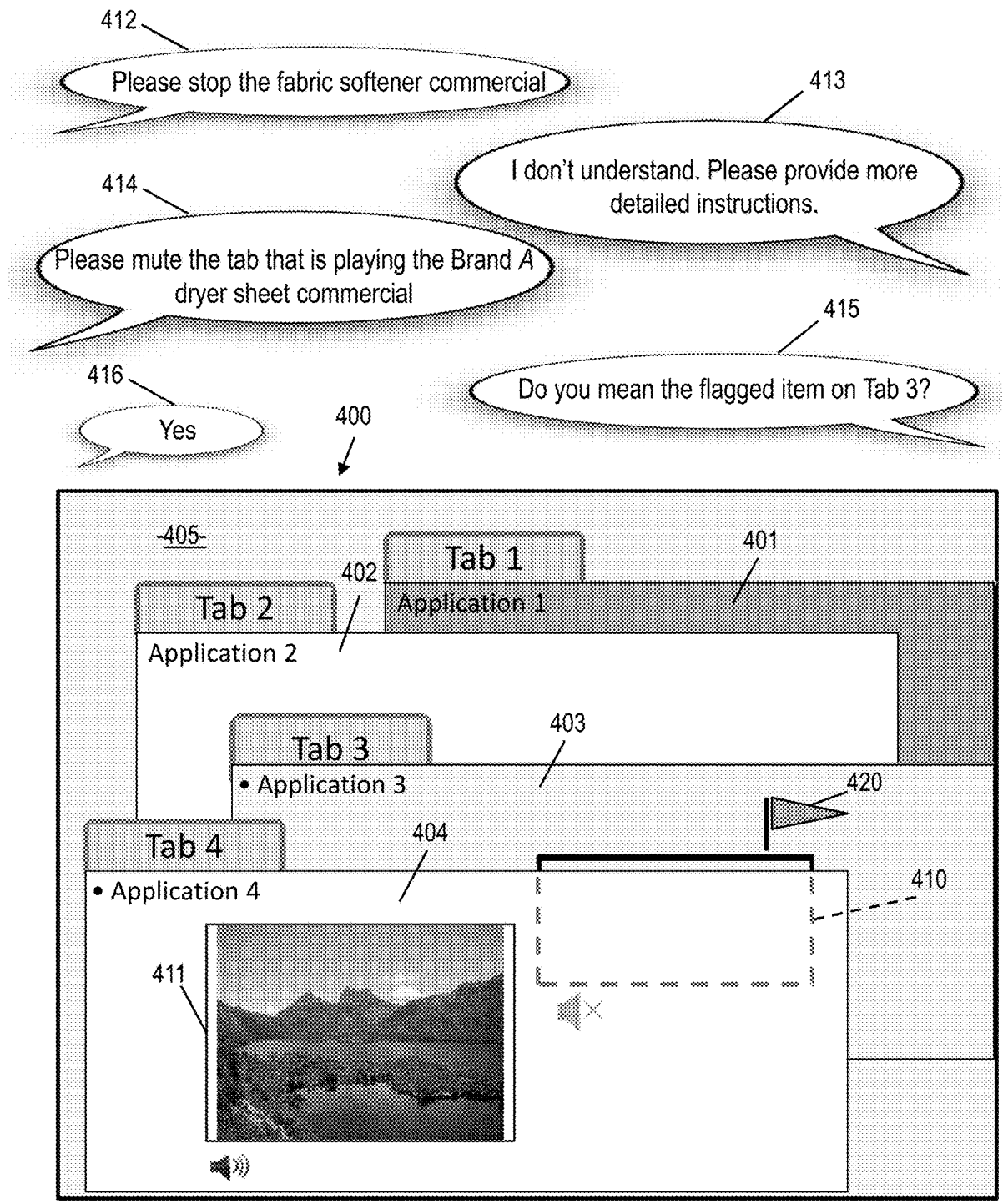
FIG. 4 illustrates an exemplary use scenario in accordance with embodiments of the invention.

FIG. 4 illustrates an exemplary use scenario in accordance with embodiments of the invention. Steps of the method of FIG. 3 may be performed in the example of FIG. 4 utilizing the components of FIG. 2

In the example of FIG. 4, a GUI 400 is shown including a plurality of child windows 401-404 within a parent window 405. The child windows 401-404 are in the form of a plurality of web browser tabs 1-4 for open Applications 1-4. In the example of FIG. 4, the out of focus Application 3 of child window 403 includes an active audio/video file (audio content) 410, which is hidden from the user, and is playing a fabric softener commercial. Additionally, in focus Application 4 of child window 404 includes an audio/video file 411 of interest to the user. The audio/video file 410 is disruptive and detracts from the user's viewing experience of the audio/video file 411; however, with multiple tabs open, the user of the GUI 400 is unable to easily identify the source of the undesirable audio content 410. Accordingly, the user verbally issues a user request 412, which is received by the user computer device 60 in accordance with step 302 of FIG. 3.

In scenario of FIG. 4, the user computer device 60 determines that there is no match between the user request 412 "Please stop the fabric softener commercial" and open application content in the buffer 74. In accordance with step 304 of FIG. 3, the user computer device 60 issues a prompt or message 413 for additional information. Specifically, the user computer device 60 issues an audio message 413 stating "I don't understand. Please provide more detailed instructions". In response to the audio message 413, the user issues a follow-up user request 414, by stating "Please mute the tab that is playing the Brand A dryer sheet commercial". The user computer device 60 receives the follow-up user request 414 in accordance with step 302 of FIG. 3, and determines that the open Application 3 of child window 403 matches the follow-up user request 414 in accordance with step 303 of FIG. 3. In this example, the user computer device 60 determines the focus of the open Application 3 of child window 403 in accordance with step 305 of FIG. 3, and initiates an action based on the follow-up user request 414 in accordance with step 306 of FIG. 3. Specifically, the user computer device 60 flags the child window 403 with a visual indicator 420.

Still referencing FIG. 4, the user computer device issues a follow-up inquiry 415 (e.g., an audio message) as part of step 306 of FIG. 3, stating "Do you mean the flagged item on Tab 3?" In accordance with step 307 of FIG. 3, the user computer device next receives a user confirmation 416 (audio message) from the user, stating "yes" in response to the inquiry 415. In accordance with step 306 of FIG. 3, the user computer device mutes the audio file 410 of the out of focus child window 403 in response to the user request 414 and the follow-up user confirmation 416. It should be understood that FIG. 4 is provided as one example of a possible use scenario, and that the invention is not intended to be limited to the example set forth therein.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for application management utilizing a natural language command interface. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting, by a computing device, open applications of the computing device;
    determining, by the computing device, content and context of audio content of one or more of the open applications as the audio content is playing on the computing device based on natural language processing of the audio content;
    storing, by the computing device, a buffer that tags and tracks the audio content and the audio context of the detected open applications;
    receiving, by the computing device, a user audio request to take an action, the user audio request including at least one content descriptor;
    comparing, by the computing device, the at least one content descriptor of the user audio request with the audio content and the audio context tracked by the buffer;
    determining, by the computing device, that at least one of the open applications of the detected open applications is a match for the user audio request based on the comparing the at least one content descriptor of the user audio request with the audio content and the audio context tracked by the buffer; and
    initiating, by the computing device, a function with respect to the at least one of the open applications based on the user audio request in response to the determining the at least one of the open applications is a match.

2. The computer-implemented method of claim 1, wherein the detecting the open applications comprises passively monitoring an operating system of the computing device to detect the open applications.

3. The computer-implemented method of claim 1, further comprising:
    receiving, by the computing device, an initial user audio request regarding the at least one of the open applications;
    determining, by the computing device, that no initial match is found between the initial user audio request and the at least one of the open applications utilizing the buffer; and
    prompting, by the computer device, the user to provide information,
    wherein the user audio request is received in response to the prompting the user to provide the information.

4. The computer-implemented method of claim 1, wherein the initiating the function based on the user audio request comprises automatically initiating the action.

5. The computer-implemented method of claim 1, wherein the function is selected from the group consisting of: stopping the at least one of the open applications; muting audio of the at least one of the open applications; stopping audio of the at least one of the open applications; changing a volume of audio of the at least one of the open applications; bringing the at least one of the open applications in focus; closing the at least one of the open applications; and highlighting the at least one of the open applications.

6. The computer-implemented method of claim 1, wherein the determining the at least one of the open applications is a match comprises determining that a plurality of the open applications are a match for the user audio request based on the at least one content descriptor and the buffer.

7. The computer-implemented method of claim 1, wherein the computing device utilizes speech to text natural language processing of the user audio request in the determining the at least one of the open applications is a match for the user audio request.

8. A computer program product comprising a computer readable storage medium having program instructions embodied therewith, the program instructions executable by a computing device to cause the computing device to:
   detect open applications on a graphical user interface of the computing device, wherein at least one of the open applications is hidden from a user in a graphical user interface;
   determine content and context of audio content of the respective open applications as the audio content is playing in real-time based on natural language processing of the audio content;
   store a buffer that tags and tracks the audio content and the audio context of the detected open applications;
   receive a user audio request to take an action regarding at least one of the open applications, the user audio request including at least one content descriptor;
   compare the at least one content descriptor of the user audio request with the audio content and the audio context tracked by the buffer;
   determine a match between the content descriptor in the user audio request and the at least one of the open applications based on the comparing the at least one content descriptor of the audio request and the audio content and the audio context of the open applications tracked in the buffer; and
   in response to the determining the match, initiate a function with respect to the audio content of the at least one of the open applications based on the user request.

9. The computer program product of claim 8, wherein the detecting the open applications comprises passively monitoring an operating system of the computing device to detect the open applications.

10. The computer program product of claim 8, wherein the program instructions further cause the computing device to:
   receive an initial user audio request regarding the at least one of the open applications;
   determine that no initial match is found between the initial user audio request and the at least one of the open applications utilizing the buffer; and
   prompt the user to provide information,
   wherein the user audio request is received in response to the prompting the user to provide the information.

11. The computer program product of claim 8, wherein the function is selected from the group consisting of: stopping the at least one of the open applications; muting audio of the at least one of the open applications; stopping audio of the at least one of the open applications; changing a volume of audio of the at least one of the open applications; bringing the at least one of the open applications in focus; closing the at least one of the open applications; and highlighting the at least one of the open applications to the user.

12. The computer program product of claim 8, wherein the determining the match between the user audio request and the at least one of the open applications utilizing the buffer comprises matching a plurality of the open applications.

13. The computer program product of claim 8, wherein:
   the computing device utilizes speech to text natural language processing of the user request in the determining the match between the user request and the at least one of the open applications.

14. A system comprising:
   a processor, a computer readable memory and a computer readable storage medium associated with a computing device;
   program instructions to detect open applications on the computing device, wherein at least one of the open applications is hidden from a user in a graphical user interface;
   program instructions to determine content and context of audio content of the respective open applications as the audio content is playing in real-time based on natural language processing of the audio content;
   program instructions to store a buffer that tags and tracks the audio content and the audio context of the open applications in real time;
   program instructions to receive a user voice command to take an action regarding at least one of the open applications, the user voice command including at least one content descriptor;
   program instructions to compare the at least one content descriptor of the user voice command with the audio content and the audio context tracked by the buffer;
   program instructions to determine a match between the user voice command and the at least one of the open applications based on the comparing the at least one content descriptor of the user voice command and the audio content and the audio context of the open applications tracked by the buffer; and
   program instructions to initiate a function with respect to the at least one of the open applications based on the user voice command after the determining the match,
   wherein the program instructions are stored on the computer readable storage medium for execution by the processor via the computer readable memory.

15. The system of claim 14, further comprising:
   program instructions to receive an initial user voice command regarding the at least one of the open applications;
   program instructions to determine, that no initial match is found between the initial user voice command and the at least one of the open applications utilizing the buffer; and
   program instructions to prompt the user to provide information,
   wherein the user voice command is received in response to the prompting the user to provide the information.

16. The system of claim 14, wherein:
   the computing device utilizes speech to text natural language processing of the user voice command in the determining the match between the user voice command and the at least one of the open applications;
   the function comprises highlighting the at least one of the open applications such that the at least one of the open applications is visible to the user; and the system further comprises program instructions to request confirmation that the at least one of the open applications that is highlighted is a correct match for the user's voice command, wherein the program instructions to initiate the function with respect to the at least one of the open applications is further based on receiving a confirmation from the user in response to the request, and wherein the action is selected from the group consisting of: muting audio of the at least one of the open applications; stopping audio of the at least one of the open applications; changing a volume of audio of the at least one of the open applications; and bringing the at least one of the open applications in focus.

17. The system of claim 14, wherein:

the determining the match between the user voice command and the at least one of the open applications based on the comparing the at least one content descriptor of the user voice command and the audio content and the audio context of the open applications tracked by utilizing the buffer comprises determining that the at least one content descriptor in the user voice command matches the audio content and/or audio context of a plurality of the open applications.

* * * * *